US012690513B2

(12) United States Patent
Kullberg et al.

(10) Patent No.: US 12,690,513 B2
(45) Date of Patent: Jul. 28, 2026

(54) CONTROL OF FEED OF TRIMMER LINE

(71) Applicant: HUSQVARNA AB, Huskvarna (SE)

(72) Inventors: Stefan Kullberg, Jönköping (SE);
Daniel Alexandersson, Huskvarna
(SE); Joakim Grundberg, Huskvarna
(SE)

(73) Assignee: HUSQVARNA AB, Huskvarna (SE)

( * ) Notice: Subject to any disclaimer, the term of this
patent is extended or adjusted under 35
U.S.C. 154(b) by 758 days.

(21) Appl. No.: 17/915,605

(22) PCT Filed: Mar. 31, 2021

(86) PCT No.: PCT/EP2021/058398
§ 371 (c)(1),
(2) Date: Sep. 29, 2022

(87) PCT Pub. No.: WO2021/198319
PCT Pub. Date: Oct. 7, 2021

(65) Prior Publication Data
US 2023/0157205 A1 May 25, 2023

(30) Foreign Application Priority Data

Apr. 1, 2020 (SE) .................................... 2050367-8
May 19, 2020 (SE) .................................... 2050579-8

(51) Int. Cl.
*A01D 34/416* (2006.01)
*A01D 69/02* (2006.01)
*A01D 101/00* (2006.01)

(52) U.S. Cl.
CPC .......... *A01D 34/4162* (2013.01); *A01D 69/02*
(2013.01); *A01D 2101/00* (2013.01)

(58) Field of Classification Search
CPC .............. A01D 34/416; A01D 34/4161; A01D
34/4162; A01D 34/4163

(Continued)

(56) References Cited

U.S. PATENT DOCUMENTS 4,104,796 A 8/1978 Sheldon et al.
4,236,312 A * 12/1980 Foster ................ A01D 34/4162
30/276

(Continued)

FOREIGN PATENT DOCUMENTS

CN 208572753 U 3/2019
CN 109691287 A 4/2019

(Continued)

OTHER PUBLICATIONS

International Search Report and Written Opinion for International
Application No. PCT/EP2021/058398 mailed Jul. 1, 2021.

(Continued)

*Primary Examiner* — Jason Daniel Prone
(74) *Attorney, Agent, or Firm* — Burr & Forman

(57) ABSTRACT

A trimmer head includes a rotatable housing connectable to
a trimmer line spool rotatably supported by the housing and
a locking mechanism for locking the trimmer line spool to
the housing with a locking force. The locking mechanism is
arranged to be moved from a locked to an unlocked position
when a rotation speed of the trimmer head is increased above
an operating speed. The increased rotation speed causes a
releasing force greater than the locking force. In the
unlocked position, the locking mechanism releases the trim-
mer line spool from the housing such that the trimmer line
spool is movable and a trimmer line spooled around the
spool is released and pulled out by a centrifugal force caused
by the rotation of the trimmer head, allowing feed of the
trimmer line.

13 Claims, 7 Drawing Sheets

(58) Field of Classification Search
USPC .......................................................... 30/276
See application file for complete search history.

(56) References Cited

U.S. PATENT DOCUMENTS

| | | | | |
|---|---|---|---|---|
| 4,254,550 A | * | 3/1981 | Satoh | A01D 34/4161 |
| | | | | 30/276 |
| 4,285,127 A | * | 8/1981 | Zerrer | A01D 34/4162 |
| | | | | 30/276 |
| 4,290,200 A | * | 9/1981 | Lombard | A01D 34/4162 |
| | | | | 30/276 |
| 4,347,666 A | * | 9/1982 | Moore | A01D 34/4162 |
| | | | | 30/276 |
| 4,352,243 A | * | 10/1982 | Lombard | A01D 34/4162 |
| | | | | 30/276 |
| 4,366,621 A | * | 1/1983 | Mitchell | A01D 34/4162 |
| | | | | 30/276 |
| 4,366,622 A | * | 1/1983 | Lombard | A01D 34/4162 |
| | | | | 30/276 |
| 4,426,780 A | * | 1/1984 | Foster | A01D 34/4162 |
| | | | | 30/276 |
| 4,483,069 A | | 11/1984 | Moore | |
| 4,490,910 A | | 1/1985 | Mattson et al. | |
| 4,493,151 A | * | 1/1985 | Mitchell | A01D 34/4162 |
| | | | | 30/276 |
| 4,607,431 A | * | 8/1986 | Gay | A01D 34/4162 |
| | | | | 30/276 |
| 4,625,501 A | * | 12/1986 | Baba | A01D 34/416 |
| | | | | 30/276 |
| 4,651,421 A | * | 3/1987 | Zerrer | A01D 34/4162 |
| | | | | 30/347 |
| 4,660,286 A | | 4/1987 | Engelbrecht et al. | |
| 4,667,410 A | * | 5/1987 | Weid | A01D 34/4161 |
| | | | | 30/347 |
| 4,817,288 A | * | 4/1989 | Hirose | A01D 34/4162 |
| | | | | 30/276 |
| 4,852,258 A | | 8/1989 | Foster | |
| 4,860,451 A | * | 8/1989 | Pilatowicz | A01D 34/902 |
| | | | | 30/276 |
| 4,866,846 A | * | 9/1989 | Hoffmann | A01D 34/4162 |
| | | | | 30/276 |
| 4,888,871 A | * | 12/1989 | Engelbrecht | A01D 34/4162 |
| | | | | 30/276 |
| 4,926,557 A | * | 5/1990 | Haupt | A01D 34/4162 |
| | | | | 30/276 |
| 4,989,321 A | * | 2/1991 | Hoffmann | A01D 34/4162 |
| | | | | 30/276 |
| 5,020,224 A | * | 6/1991 | Haupt | A01D 34/4162 |
| | | | | 30/276 |
| 5,036,648 A | * | 8/1991 | Hoffmann | A01D 34/4162 |
| | | | | 30/DIG. 5 |
| 5,063,673 A | * | 11/1991 | Webster | A01D 34/4162 |
| | | | | 30/276 |
| 5,193,278 A | * | 3/1993 | Osakabe | A01D 34/4162 |
| | | | | 30/276 |
| 5,222,301 A | * | 6/1993 | Sugihara | A01D 34/4161 |
| | | | | 30/276 |
| 5,276,968 A | * | 1/1994 | Collins | A01D 34/4162 |
| | | | | 30/276 |
| 5,311,665 A | * | 5/1994 | Sugihara | A01D 34/4162 |
| | | | | 30/276 |
| 5,671,536 A | * | 9/1997 | Everts | A01D 34/416 |
| | | | | 30/276 |
| 5,806,192 A | * | 9/1998 | Everts | A01D 34/4163 |
| | | | | 30/276 |
| 5,855,068 A | * | 1/1999 | Zilly | A01D 34/4162 |
| | | | | 30/276 |
| 6,148,523 A | * | 11/2000 | Everts | A01D 34/4163 |
| | | | | 30/276 |
| 7,275,324 B2 | | 10/2007 | Proulx | |
| 7,536,792 B2 | | 5/2009 | Moore | |
| 7,823,291 B2 | * | 11/2010 | Shibasaki | A01D 34/4162 |
| | | | | 30/276 |
| 8,510,960 B2 | | 8/2013 | Pfaltzgraff et al. | |
| 9,253,942 B2 | | 2/2016 | Alliss et al. | |
| 10,034,422 B2 | * | 7/2018 | Palermo | A01D 34/4162 |
| 10,939,613 B2 | * | 3/2021 | Ma | A01D 34/4163 |
| 11,818,979 B2 | * | 11/2023 | Guo | A01D 34/4162 |
| 12,114,596 B2 | * | 10/2024 | Kullberg | A01D 34/4162 |
| 2012/0066913 A1 | | 3/2012 | Alliss et al. | |
| 2014/0325851 A1 | | 11/2014 | Bone | |
| 2018/0098492 A1 | | 4/2018 | Guo et al. | |
| 2018/0168098 A1 | | 6/2018 | Alliss | |
| 2023/0397527 A1 | * | 12/2023 | Guo | A01D 34/4162 |
| 2024/0268260 A1 | * | 8/2024 | Holman | A01D 34/416 |

FOREIGN PATENT DOCUMENTS

| | | | | | |
|---|---|---|---|---|---|
| CN | 115605076 A | * | 1/2023 | ......... | A01D 34/4162 |
| DE | 102007056319 A1 | | 5/2009 | | |
| DE | 112021000733 T5 | * | 11/2022 | ......... | A01D 34/4162 |
| EP | 1358787 B1 | | 2/2005 | | |
| EP | 3257350 A1 | | 12/2017 | | |
| EP | 3682726 A1 | | 7/2020 | | |
| JP | H0576226 U | | 10/1993 | | |
| JP | 2006014686 A | | 1/2006 | | |
| JP | 2016059310 A | | 4/2016 | | |
| WO | 2017059917 A1 | | 4/2017 | | |
| WO | 2019076083 A1 | | 4/2019 | | |
| WO | 2019154610 A1 | | 8/2019 | | |
| WO | WO-2021198319 A1 | * | 10/2021 | ......... | A01D 34/4162 |

OTHER PUBLICATIONS

Office Action and Search Report for Swedish Application No. 2050579-8 mailed on Dec. 22, 2020.

* cited by examiner

600

CONTROL OF FEED OF TRIMMER LINE

TECHNICAL FIELD

The present disclosure generally relates to trimmers. In particular, the various embodiments described in this disclosure relate to a method, a trimmer head and a trimmer for controlling feed of trimmer line in a trimmer.

BACKGROUND

A trimmer is a tool for cutting grass and ground cover using a rotating line, or a plurality of lines. Such a trimmer is also known as a string trimmer, line trimmer or strimmer. As the line hits the grass, or other growth, the grass is cut by the line. This physical interaction between the grass and the trimmer line wears on the trimmer line and over time, the trimmer line is typically shortened. To provide for an even cutting operation, more trimmer line needs to be fed.

Traditionally, a push button is arranged on the underside of the trimmer head. As an operator wants to feed more trimmer line, the operator bumps the trimmer head to the ground, thereby pushing the push button, which causes the trimmer line to be fed. However, as the push button protrudes from the trimmer head, this arrangement adds to the cutting height of the trimmer head and is thus unsuitable for close and precise trimming. Furthermore, the bumping action may cause unwanted circular marks to be formed in the grass. Therefore, other ways of initiating feeding out trimmer line has been developed, such as pushing a button, manual activation or fully automatically feeding out. With pushing a button feeding, trimmer line feed is executed by pushing the button instead of bumping the trimmer head towards the ground. These trimmers generally work with one-way rotation, i.e. trimmer heads that rotates one way. To manage two-way rotation trimmers, these trimmer heads have been further developed. However, these trimmer heads are more complex and comprise many parts. Since a trimmer head is a wear and tear part, it is desirable to keep it as simple and robust as possible.

Thus, there is a need for an improved manner of feeding trimmer line, which works also with two-way rotation trimmers.

SUMMARY

In view of the above, it is therefore a general object of the aspects and embodiments described throughout this disclosure to provide a solution with an improved manner of feeding trimmer line, which is robust, comprises few parts and works with two-way rotation trimmers.

This general object has been addressed by the appended independent claims. Advantageous embodiments are defined in the appended dependent claims.

According to a first aspect, there is provided a trimmer head. The trimmer head comprises a rotatable housing connectable to a trimmer line spool rotatably supported by said housing and a locking mechanism for locking said trimmer line spool to said housing with a locking force. The locking mechanism is arranged to be moved from a locked position to an unlocked position when a rotation speed of said trimmer head is increased above an operating speed. The increased rotation speed causing a releasing force greater than the locking force. Said locking mechanism in the unlocked position releases the trimmer line spool from said housing such that the trimmer line spool is rotatable relative the housing and a trimmer line spooled around the trimmer line spool is released and to be pulled out by a centrifugal force caused by the rotation of the trimmer head, thereby allowing feed of the trimmer line.

In some embodiments, the locking mechanism is a spring-loaded locking mechanism. The increased speed shifts a centre of gravity of the locking mechanism causing the releasing force to be greater than the locking force of the spring-loaded locking mechanism.

In some embodiments, the locking mechanism is arranged to be moved back to the locked position from the unlocked position when the rotation speed of said trimmer head is decreased below the operating speed, wherein the releasing force is reduced to be smaller than the locking force.

In some embodiments, the locking mechanism comprises a pivotal locking latch and the trimmer line spool comprises at least one stop. The pivotal locking latch is arranged to engage with one of the at least one stop(s) in the locked position. According to one embodiment, the trimmer line spool may further comprise at least one releasing stop, wherein the pivotal locking latch may be arranged to engage with one of the at least one releasing stop(s) when the locking mechanism is moved to the unlocked position.

In some embodiments, the trimmer head comprises a button arranged on the housing, wherein the button is operably connected to the locking mechanism to move the locking mechanism to the unlocked position when the button is pressed. In this manner, a user can perform a manual feed of trimmer line by pressing the button and pulling trimmer line out of the trimmer head.

In some embodiments, the locking mechanism allows a manual rotation of the trimmer line spool relative to the housing in one rotational direction. Thereby, a trimmer head is provided allowing loading of trimmer line into the trimmer head without having to dissemble the trimmer head.

In some embodiments, the trimmer head comprises a grip arranged on the housing. Thereby, the process of loading of trimmer line into the trimmer head is facilitated.

In some embodiments, the trimmer head comprises a recess at an underside of the trimmer head, and wherein the grip is arranged inside the recess. Thereby, a user-friendly trimmer head is provided while the grip is unlikely to bump into objects during operation of the trimmer head. Moreover, the grip may not add to the cutting height of the trimmer head.

According to a second aspect, there is provided a trimmer comprising a trimmer head according to the first aspect. The trimmer further comprises drive means for driving the trimmer head to rotate. The trimmer is arranged to cause the trimmer line spool to rotate relative the housing by increasing the rotation speed of the trimmer head to be above an operating speed.

In some embodiments, the rotation speed of the trimmer head is increased in response to an activation action.

In some embodiments, the trimmer is arranged to cause the locking mechanism to move from the unlocked position to the locked position locking the trimmer line spool to the housing by decreasing the rotation speed of the trimmer head below the operating speed. The trimmer may be arranged to decrease the rotation speed of the trimmer head by alternating decrease and increase of the rotation speed of the trimmer head until the rotation speed of the trimmer head is below the operating speed.

In some embodiments, the trimmer is arranged to decrease the rotation speed of the trimmer head once the rotation speed has reached the maximum rotation speed. In other embodiments, the trimmer is arranged to decrease the rotation speed of the trimmer head a predetermined time after the rotation speed has been increased.

In some embodiments, the trimmer is an electric trimmer and the drive means comprises an electrical power source and an electric motor. In other embodiments, the trimmer is an internal combustion engine powered trimmer and the drive means comprises a fuel tank, an engine and may also contain a gear assembly.

According to a third aspect, there is provided a method for controlling feed of trimmer line in a trimmer comprising a trimmer head. The trimmer head comprises a rotatable housing, a trimmer line spool rotatably supported by said housing and a locking mechanism for locking said trimmer line spool. The method comprises increasing a rotation speed of said trimmer head to be above an operating speed, at which increased rotation speed the locking mechanism is moved from a locked position to an unlocked position and a trimmer line spooled around the trimmer line spool is released and to be pulled out by a centrifugal force caused by the rotation of the trimmer head, thereby allowing feed of the trimmer line.

In some embodiments, the rotation speed is increased in response to an activation action.

In some embodiments, the method further comprises decreasing the rotation speed of said trimmer head to below the operating speed, whereby the locking mechanism moves from the unlocked position to the locked position. According to one embodiment, the method may comprise decreasing the rotation speed of the trimmer head by alternating decrease and increase of the rotation speed of the trimmer head until the rotation speed of the trimmer head is below the operating speed.

In some embodiments, the method further comprises decreasing the rotation speed of said trimmer head once the rotation speed has reached the maximum rotation speed. In other embodiments, the method further comprises decreasing the rotation speed of said trimmer head a predetermined time after the rotation speed has been increased.

Some of the above embodiments eliminate or at least reduce the drawbacks discussed earlier in this disclosure. The proposed embodiments herein provide a robust and simple trimmer head with few parts, which provides an improved manner of feeding trimmer line that also works with two-way rotation trimmers.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
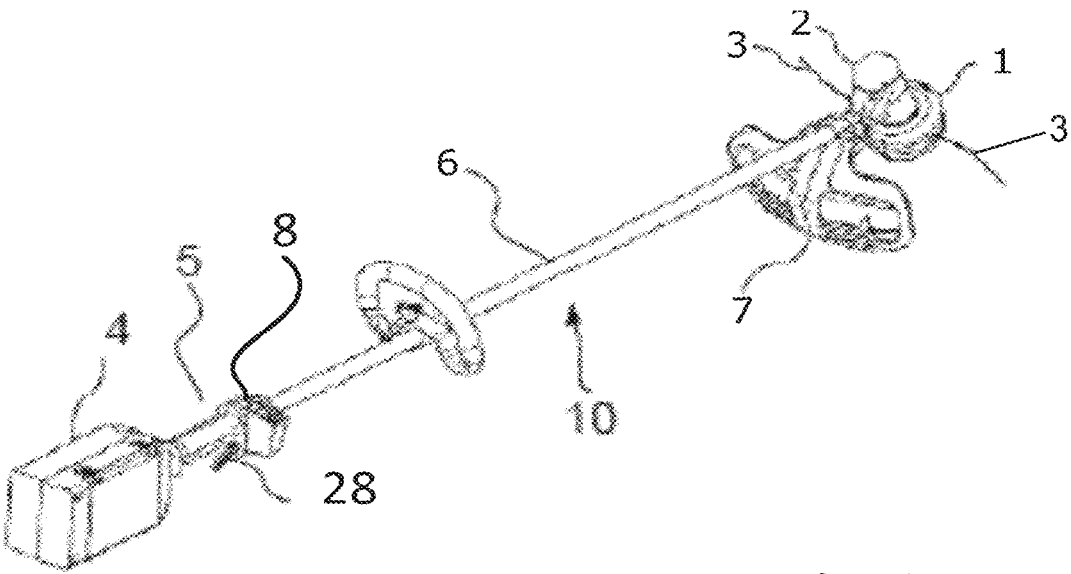
FIG. 1 shows a schematic overview of a trimmer.

In one of its aspects, the disclosure presented herein concerns a trimmer 10. FIG. 1 illustrates a schematic overview of such a trimmer 10. The trimmer 10 in FIG. 1 is a string trimmer, which may be used to cut, or trim, grass and ground cover, in, for example, gardens, parks and other areas with vegetation. The trimmer 10 comprises a trimmer head 1 according to another aspect of the present disclosure. The trimmer head 1 is a rotary cutting equipment and may be provided with a trimmer line 3, which extends radially from the trimmer head 1. The trimmer line 3 may extend in any number of directions, but a balanced arrangement is preferred. Typically, two trimmer lines 3 are used and arranged to extend in opposite directions from one another.

Figure 2:
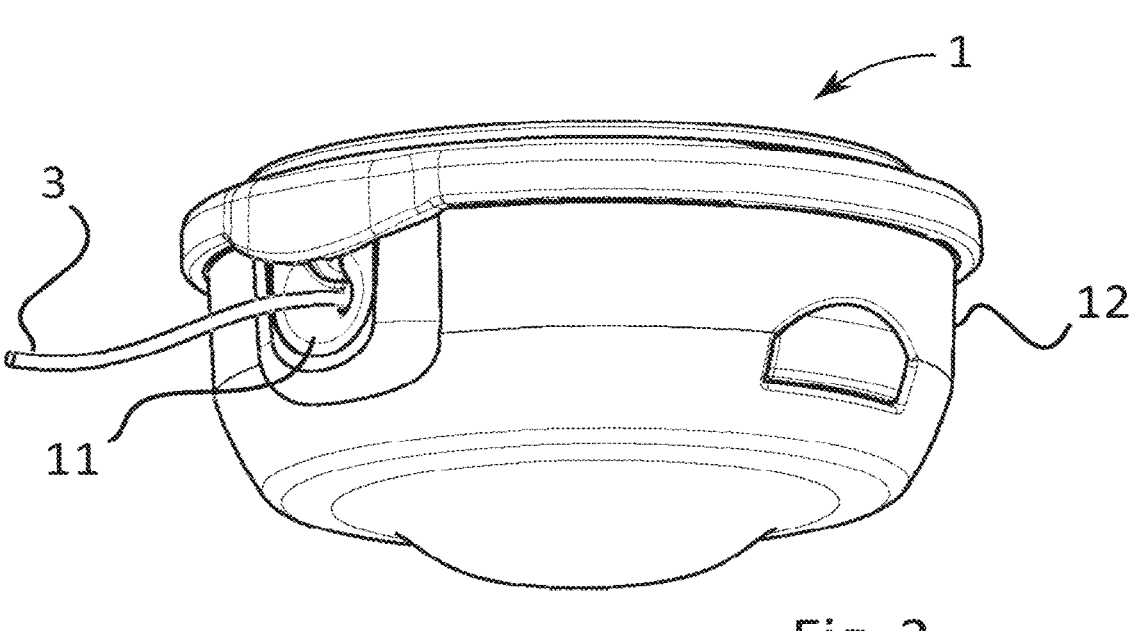
FIG. 2 shows a schematic overview of a trimmer head.

FIG. 2 illustrates a schematic overview of the trimmer head 1 according to the present disclosure. As illustrated in FIG. 2, the trimmer head 1 comprises a housing 12. The housing 12 is connectable to a trimmer line spool 13 rotatably supported by said housing 12. Thus, when the trimmer 10 is in use, the housing 12 of the trimmer head 1 is connected to a trimmer line spool 13. When the trimmer 10 is not in use, a trimmer line spool 13 may not necessarily be connected to the housing 12, even though it may be. The trimmer line spool 13 may be connected to the housing 12, for example, via a spring, such as a torsion spring. The trimmer line spool 13 cannot be seen in FIG. 2, as the trimmer line spool 13 is connectable to the housing 12 inside, or within, the housing 12 as most clearly seen in FIG. 4b. A trimmer line 3 extends through holes or openings 11 in the trimmer head housing 12. The trimmer line 3 is spooled around the trimmer line spool 13, as most clearly seen in FIG. 4a.

Figure 3:
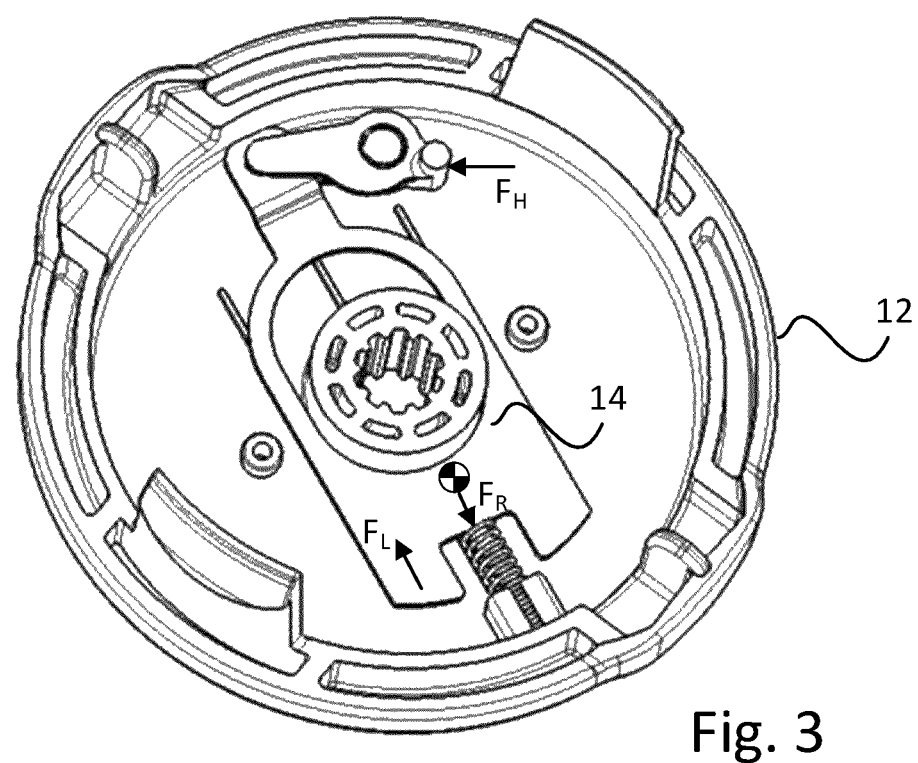
FIG. 3 shows a schematic overview of a trimmer head with a locking mechanism according to one embodiment.

The trimmer head 1 further comprises a locking mechanism 14 for locking the trimmer line spool 13 to the housing 12. The trimmer line spool 13 is locked to the housing 12 by the locking mechanism 14 with a holding force $F_H$. FIG. 3 illustrates the holding force $F_H$ and the locking mechanism 14 in relation to the housing 12. When the trimmer line spool 13 is locked to the housing 12, the trimmer line spool 13 does not rotate relative the housing 12. In the locked position, the trimmer line spool 13 rotates together with the housing 12.

Figure 4A:
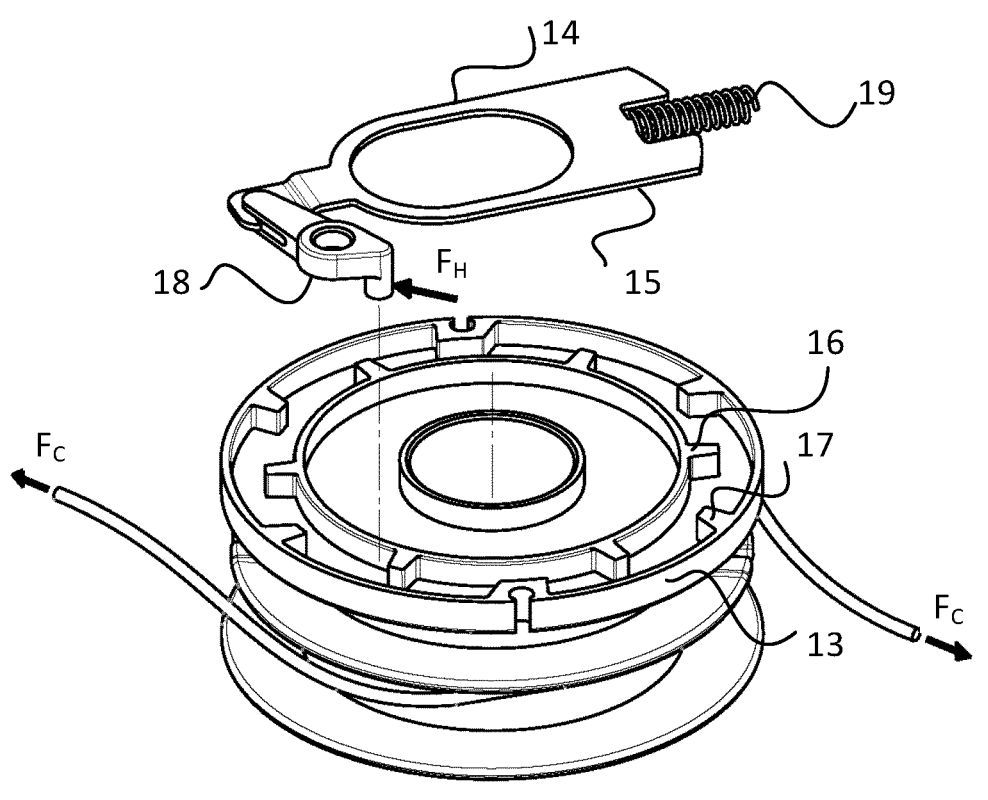
FIG. 4a shows a schematic overview of a trimmer line spool with a locking mechanism according to one embodiment.

FIG. 4a illustrates a perspective view of the trimmer line spool 13 relative the locking mechanism 14 and the applied holding force $F_H$. The locking mechanism 14 is arranged to be moved from a locked position to an unlocked position when a rotation speed of said trimmer head 1 is increased above an operating speed. The operating speed is the speed at which the trimmer head 1 generally operates, i.e. the speed at which the trimmer head 1 may be used for cutting grass, or ground cover. The operating speed may comprise a range of speeds and in these embodiments, the rotation speed is increased to be above the maximum operating speed, e.g. 1.1-1.3 times the maximum operating speed. As an example, the maximum operating speed may be approximately 5500 revolutions per minute (rpm), while the increased speed may be in the range of approximately 6500-7000 rpm. However, it may be appreciated that the ranges of speeds may be lower or higher than the exemplified ranges as long as the rotation speed that moves the locking mechanism 14 from a locked position to an unlocked position is significantly higher than, and thus distinct from, the operating speed.

The increased rotation speed causes a releasing force $F_R$ greater than a locking force $F_L$. Thus, when the rotation speed is increased, a releasing force $F_R$ that is greater than the locking force $F_L$ is applied to the locking mechanism 14. The locking mechanism 14 is then forced to be moved from the locked position to the unlocked position. In the unlocked position, the locking mechanism 14 releases the trimmer line spool 13 from the housing 12 such that the trimmer line spool 13 is rotatable relative the housing 12. The trimmer line 3 spooled around the trimmer line spool 13 is then released and to be pulled out by a centrifugal force $F_C$ caused by the rotation of the trimmer head 1. Thereby, feed of the trimmer line 3 is allowed. The fed length of trimmer line 3 corresponds to the relative rotation between the housing 12 and the trimmer line spool 13. Thus, when a rotation speed of the trimmer head 1 is increased to be above an operating speed, trimmer line 3 is fed.

By providing a trimmer head 1 where trimmer line 3 is fed by increasing the rotation speed above the operating speed, the operating speed range is separated from the line feed speed range. This will ensure that trimmer line 3 is not fed accidentally. Trimmer line 3 is only going to be fed when the rotation speed is increased, which happens when the motor is boosted above the operating speed. Thus, accidental feeds will be eliminated, or at least reduced. Additionally, with the provided construction of the provided trimmer line feed mechanism, it is also possible to use the line feed mechanism with two-way rotation trimmers.

Figure 4B:
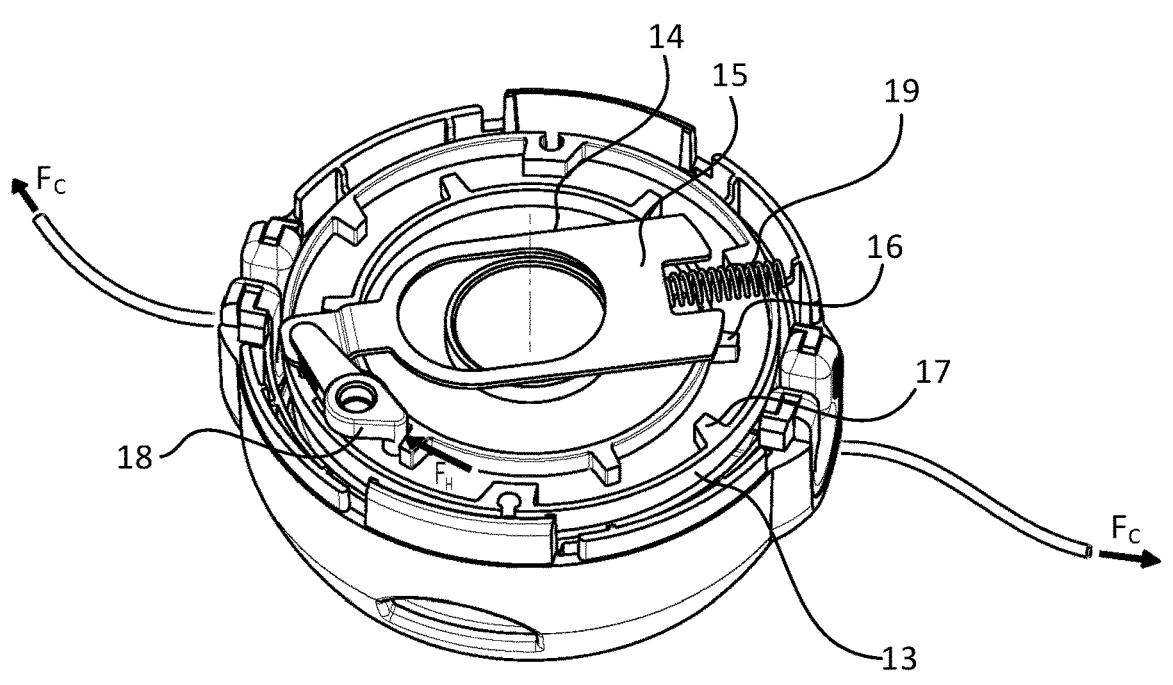
FIG. 4b shows a schematic overview of the trimmer line spool and locking mechanism according to FIG. 4a when mounted in the housing of a trimmer head.

According to one embodiment, as also illustrated in FIGS. 3, 4a and 4b, the locking mechanism 14 may be a spring-loaded locking mechanism 14. The increased speed may shift a center of gravity of the locking mechanism 14 causing the releasing force $F_R$ to be greater than the locking force $F_L$ of the spring-loaded locking mechanism 14. When the releasing force $F_R$ becomes greater than the locking force $F_L$, the locking mechanism 14 is moved from the locked position to the unlocked position.

As illustrated in FIGS. 4a and 4b, the spring-loaded locking mechanism 14, according to one embodiment, comprises a spring 19 and a baseplate 15. According to the embodiments illustrated in FIGS. 4a and 4b, the spring is a type of coil spring. According to further embodiments, the spring-loaded locking mechanism 14 may comprise another type of spring, such as a leaf spring, or the like. The baseplate 15 is provided with a slotted through hole. Due to the slotted hole, the baseplate 15 of the spring-loaded mechanism will move when the rotation speed is increased, as the center of gravity shifts. The movement of the baseplate 15 will increase the releasing force $F_R$, and as previously described, when the releasing force $F_R$ is greater than the locking force $F_L$, the trimmer line spool 13 will be released from the housing 12. When the trimmer line spool 13 is released, the trimmer line 3 feed is allowed. By providing a spring-loaded locking mechanism 14, a trimmer line feed mechanism is achieved using few parts. This makes the trimmer head 1 robust and makes it suitable for use also with two-ways rotation trimmers.

Figure 5A:
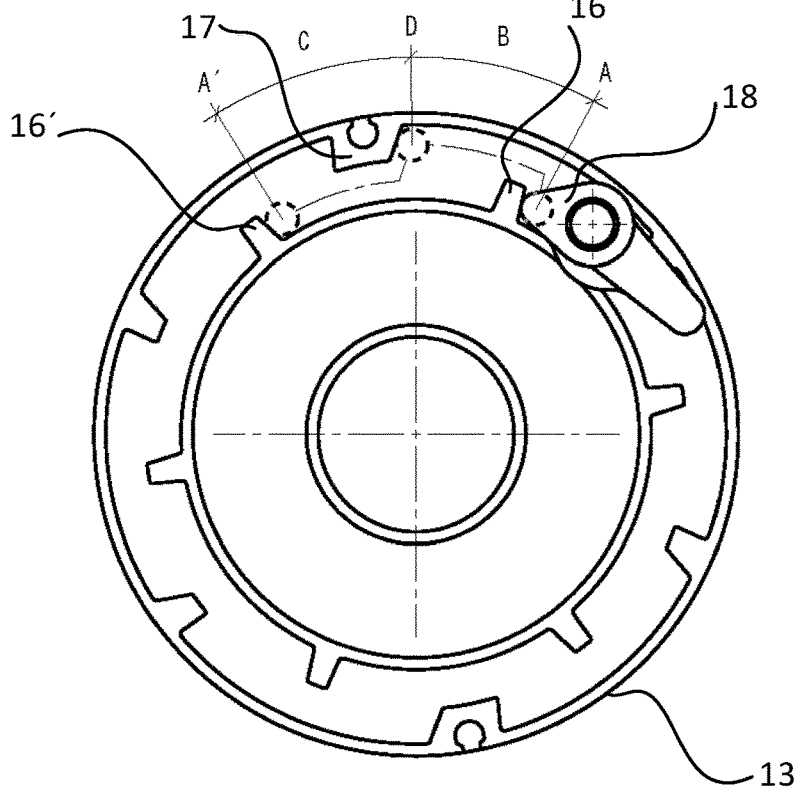
FIG. 5a shows a schematic overview of the rotation of the spool in relation to the locking mechanism during a feed line sequence according to one embodiment.

In some embodiments, as illustrated in FIG. 5a, the locking mechanism 14 may comprise a pivotal locking latch 18 and the trimmer line spool 13 may comprise at least one stop 16. The pivotal locking latch 18 may be arranged to engage with one of the at least one stop(s) 16, 16' in the locked position. Thus, when the locking mechanism 14 is in the locked position A, A', the pivotal latch 18 may rest against one of said at least one stop(s) 16, 16'.

According to some embodiments, the trimmer line spool 13 may further comprise at least one releasing stop 17. The pivotal locking latch 18 may be arranged to engage with one of said at least one releasing stop 17 when the locking mechanism 14 is moved to the unlocked position. Thus, when the locking mechanism 14 is moved from the locked position to the unlocked position, the pivotal locking latch 18 is forced from its position resting against one of the stops 16, 16' to engage with one of said at least one releasing stop(s) 17.

According to these embodiments, the trimmer line spool 13 may rotate with respect to the housing 12 to a degree defined by the distance B between the stop 16 and the releasing stop 17. Thus, the arrangement of the stop 16 and the releasing stop 17, and the distance between them, may control the amount of rotation of the trimming line spool 13 relative the housing 12. The amount of rotation B of the trimming line spool 13 relative the housing 12 denotes how much trimmer line 3 is fed each time the locking mechanism 14 is rotated between the locked and the unlocked positions. FIG. 5a illustrates a trimmer line spool 13 having six stops 16, 16' and six releasing stops 17. However, it may be realized that the trimmer line spool 13 may have more or fewer stops 16, 16', 17 than that. The more stops, the shorter trimmer line 3 is fed. The fewer stops, the longer trimmer line 3 is fed. However, having fewer stops 16, 16', 17 may cause the user to feel a more abrupt stop of the trimmer line spool 13 and a design compromise may be made between length of trimmer line 3 to feed and smoothness of operation.

In some embodiments, the locking mechanism 14 may be arranged to be moved back to a locked position A' from the unlocked position when the rotation speed of the trimmer head 1 is decreased below the operating speed. According to some embodiments, the movement back to a locked position starts with the locking latch 18 resting against a releasing stop 17, When the rotation speed of the trimmer head 1 is decreased below the operating speed, the releasing force $F_R$ is reduced to be smaller than the locking force $F_L$ and the locking latch 18 returns to rest against the subsequent stop 16', the position marked A' in FIG. 5a. This is described more in detail below with relation to the trimmer 10.

As previously described, in one of its aspects, the disclosure presented herein concerns a trimmer 10, which is illustrated in FIG. 1. The trimmer 10 comprises a trimmer head 1 according to any of the previously described embodiments. The trimmer 10 further comprises drive means 2, 4 for driving the trimmer head 1 to rotate. The trimmer 10 is arranged to cause the trimmer line spool 13 to rotate relative the housing 12 of the trimmer head 1 by increasing the rotation speed of the trimmer head 1 to be above an operating speed. This will cause trimmer line 3 to be fed.

In one example embodiment, the trimmer 10 is an electric trimmer. Then, the drive means may comprise an electric power source 4, such as a battery or grid connector for providing electrical power to an electric motor 2 arranged to rotate the trimmer head 1. In another example embodiment, the trimmer 10 is an internal combustion engine powered trimmer. Then, the drive means may comprise a fuel tank for providing fuel to an engine 4 for driving the trimmer head 1 through a gear assembly 2. Even though the description herein will focus on an electric trimmer, it should be noted that the teachings herein may also be used with an internal combustion engine powered trimmer. For example, an increase of operating speed—as will be discussed in further detail in the below—may be accomplished by increasing the rotation speed of a motor by providing an increase in electrical power as well as by revving an engine by increasing the fuel injection and/or by increasing an opening degree of a throttle of the engine.

The trimmer 10 may further comprise at least one handle 5 and a pole 6 on which the power supply 4 and the trimmer head 1 may be arranged. The trimmer 10 may further comprise a trim guard or shield 7. Arranged adjacent to (or on) the at least one handle 5 may be user controls comprising one or more buttons, such as a speed control, start button and/or a button for initiating the automated trimmer line feed. The buttons may be placed on a control panel 8. The controls may comprise a dead-man's-hand switch (to be depressed by the palm of an operator's hand when holding the grip 5), a throttle control switch 28 (to be actuated by the operator's fingers), among other controls such as for changing the power level, changing the rotation direction to mention a few examples. The control panel 8 may also comprise visual indicators such as LEDs (Light Emitting Diodes) for indicating a status of the trimmer 10.

The trimmer 10 may be a two-way trimmer, wherein the trimmer may change the rotation direction of the drive means between clockwise and counterclockwise rotation for rotation of the rotary cutting equipment. Alternatively, the trimmer 10 may be a one-way trimmer.

Figure 5B:
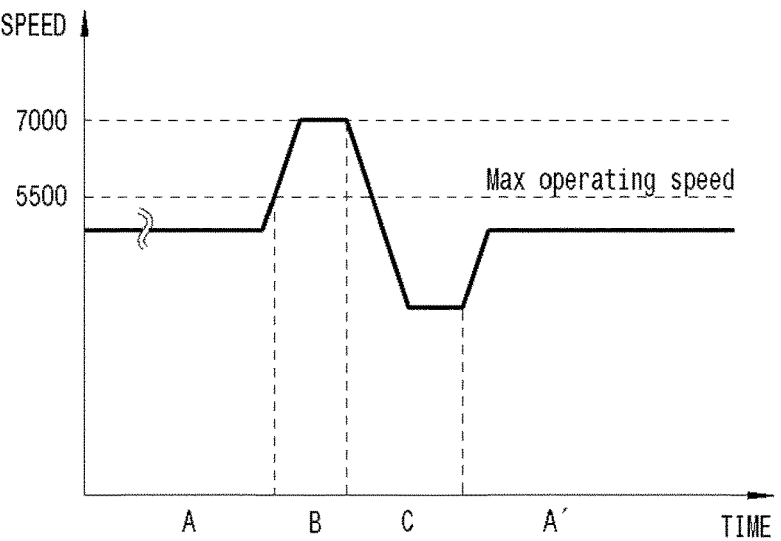
FIG. 5b shows a time graph of a feed line sequence according to one embodiment.
Figure 6:
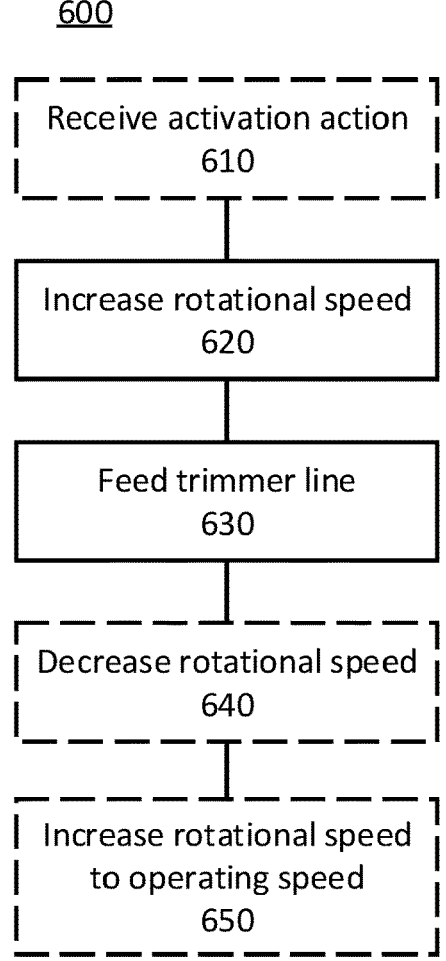
FIG. 6 shows a flowchart of a method according to one embodiment.

A method and the trimmer 10 according to the present disclosure is now going to be described with reference to FIGS. 5a and 5b and FIG. 6. FIG. 5b shows a time graph of the revolution speed of the motor 2 when controlling the feeding of trimmer line 3 and FIG. 6 shows a corresponding flowchart for the method 600 performing the control of FIG. 5b.

As seen in FIG. 5b, the trimmer 10 according to the present disclosure is configured to first increase the angular velocity of the motor 2 to rotate at an operating speed. The operating speed is the rotation speed at which the trimmer head 1 of the trimmer 10 may operate and which is used to cut, or trim, grass and ground cover. The operating speed may comprise, according to some embodiments, a range of speeds. When the operating speed comprises a range of speeds, it may be the maximum operating speed that corresponds to the operating speed. According to one embodiment, the maximum operating speed may be 5500 rpm and this max operating speed is marked with a dotted line in FIG. 5b.

Once the trimmer 10 is operating at the operating speed, the motor 2 may be caused to further increase the rotation speed of the trimmer head 1. The rotation speed of the trimmer head 1 is increased to be above the operating speed, corresponding to step 620 of the method 600. This may occur, for example, in response to receiving an activation action, corresponding to step 610 of the method 600, i.e. receiving 610 an activation action, and wherein the rotation speed is increased in response to the activation action. The activation action may be actuated, for example, by an operator issuing a command to feed the trimmer line 3. The command may be given through a button, switch, or lever on the control panel 8. With the increased rotation speed, the locking mechanism 14 is moved from a locked position to an unlocked position.

In an example embodiment, when the locking mechanism 14 is moved from a locked position, the locking latch 18 is moved radially outwards from a stop 16 (position A in FIG. 5a) to an unlocked position (region B in FIG. 5a). When the locking mechanism 14 is in the unlocked position, the trimmer line spool 13 is released and the trimmer line 3 spooled around the trimmer line spool 13 is pulled out by the centrifugal force $F_C$ caused by the rotation of the trimmer head 1, thereby allowing feed of the trimmer line 3, corresponding to step 630 of the method 600. The feed of the trimmer line 3 occurs as the trimmer line spool 13 rotates relative the housing 12, which occurs when the locking latch 18 is not in contact with a stop 16, 16' or a releasing stop 17, whereby the locking mechanism 14 does not lock the trimmer line spool 13 to the housing 12.

In some embodiments, the trimmer 10 may be configured to cause the locking mechanism 14 to move from the unlocked position to the locked position by decreasing the rotation speed of said trimmer head 1 to below the operating speed, corresponding to step 640 of the method 600. The decrease of speed corresponds to the region C in FIG. 5b. As seen in FIG. 5b, the rotation speed is decreased to below the line indicating the operating speed at 5500 rpm. Additionally, if the operating speed is a range of speeds, the rotation speed is decreased to be below, or at least within the lower range of, the operating speed. By actively braking such that the rotation speed is decreased to below the operating speed, it may be ensured that the locking mechanism 14 is moved from the unlocked position back to a subsequent locked position A' where the locking latch 18 is resting against a subsequent stop 16', and that the locking mechanism 14 is not stuck in the unlocked position.

In some embodiments, the trimmer 10 may be configured to cause the locking mechanism 14 to move from a releasing stop position D, where the locking latch 18 is resting against a releasing stop 17, to a locked position A, A', where the locking latch 18 is resting against a stop 16, 16', by decreasing the rotation speed of said trimmer head 1 to below the operating speed, corresponding to step 640 of the method 600. The decrease of speed corresponds to the region C in FIG. 5b. As seen in FIG. 5b, the rotation speed is decreased to below the line indicating the operating speed at 5500 rpm. When the rotation speed decreases, the locking latch moves radially inwards from the releasing stop position D. Additionally, if the operating speed is a range of speeds, the rotation speed is decreased to be below, or at least within the lower range of, the operating speed. By actively braking such that the rotation speed is decreased to below the operating speed, it may be ensured that the locking latch 18 is moved from the releasing stop position D back to a subsequent locked position A' feeding a controlled length of trimmer line corresponding to the distance C between the releasing stop position D and the stop position A'. By combining the method with a trimmer head with inner and outer stop positions, very precise control of the length of trimmer line fed during each activation may be achieved.

The step 640 of decreasing the rotation speed may be performed in different ways. According to one embodiment, the trimmer 10 may be configured to continuously decrease the rotation speed to be below the operating speed, for example until the rotation speed reaches a certain predetermined value or for a certain time. Alternatively, the trimmer 10 may be configured to decrease the rotation speed by alternating decrease and increase of the rotation speed of the trimmer head 1 until the rotation speed of the trimmer head 10 is below the operating speed. By alternating decrease and increase of rotation speed, the trimmer head 1 may move, or shake, by the changing rotation speed, thereby making it easier for the locking mechanism 14 to move from the releasing stop and/or unlocked position to the inner locked position A'. Regardless of which way that is used to decrease the rotation speed, the rotation speed may be decreased either a predetermined time after the rotation speed has been increased, or once the rotation speed has reached a maximum rotation speed, i.e. the maximum possible rotation speed for the trimmer 10. For example, in one embodiment, the rotation speed is decreased e.g., 0.1-0.5 sec after that the rotation speed has started to increase. Alternatively, the rotation speed is decreased once it has reached the maximum allowed rotation speed, which may have a value of e.g. 6000-7000 rpm. E.g. for trimmers powered by electric motors, international standard IEC 62841-1 SCF limits the maximum allowed rotation speed to 130% of the maximum operating rotation speed.

After the rotation speed has been decreased to be below the operating speed, the trimmer 10 may be configured to increase the rotation speed again, until it reaches the operating speed, such that the operator may continue using the trimmer 10 for cutting grass, or ground cover, step 650 of the method 600. The whole process of increasing the rotation speed to be above the operating speed, decreasing the rotation speed to be below the operating speed and to thereafter once again increasing the rotation speed to reach the operating speed, i.e. the sequence illustrated in the time graph illustrated in FIG. 5b, may take approximately 0.3-1.0 sec. Thus, the provided solution for controlling the feeding of trimmer line is both smooth and quick.

Additionally, with the provided trimmer 10 and the provided method 600, it is possible to control the feed of trimmer line 3 in a trimmer head 1 with a simple, but still robust, construction using few parts. The provided trimmer 10, trimmer head 1 and method 600, also work with two-way rotation. Furthermore, as the present disclosure provides a solution where trimmer line 3 is fed at a speed that is above the operating speed, accidental line feed is avoided. The trimmer 10 will not increase the rotation speed to be above the operating speed by accident, this will only happen when the intention is to increase the speed. Thus, the present disclosure provides a secure solution for automatic remote trimmer line 3 feed.

Figure 7:
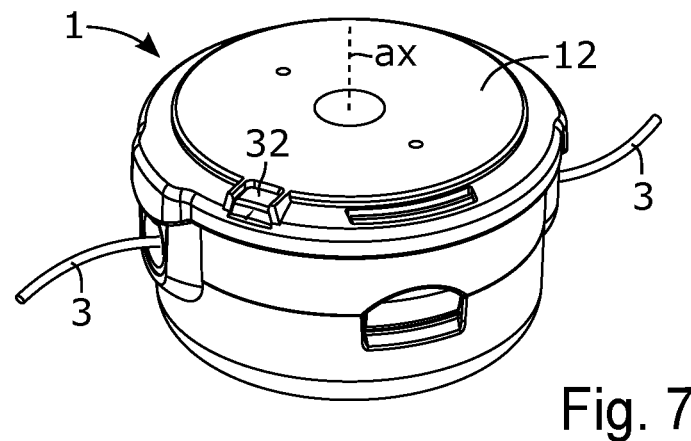
FIG. 7 illustrates a schematic overview of a trimmer head according to some further embodiments of the present disclosure.

FIG. 7 illustrates a schematic overview of the trimmer head 1 according to some further embodiments of the present disclosure. The trimmer head 1 according to the embodiments illustrated in FIG. 7 comprises the same features, functions, and advantages as the trimmer head 1 explained with reference to FIG. 1-FIG. 6, with some differences explained below. Moreover, the method 600 explained with reference to the FIGS. 5a and 5b and FIG. 6 may be performed using a trimmer head 1 according to the embodiments illustrated in FIG. 7.

The trimmer head 1 according to the embodiments illustrated in FIG. 7 allows a manual feed of trimmer line 3 by pressing a button 32 arranged on the housing 12 of the trimmer head 1 as is explained in the following. Moreover, as is explained in the following, the trimmer head 1 according to the embodiments illustrated in FIG. 7 allows a quick and simple load of trimmer line 3 into the trimmer head 1 without having to dissemble the trimmer head 1.

Figure 8A:
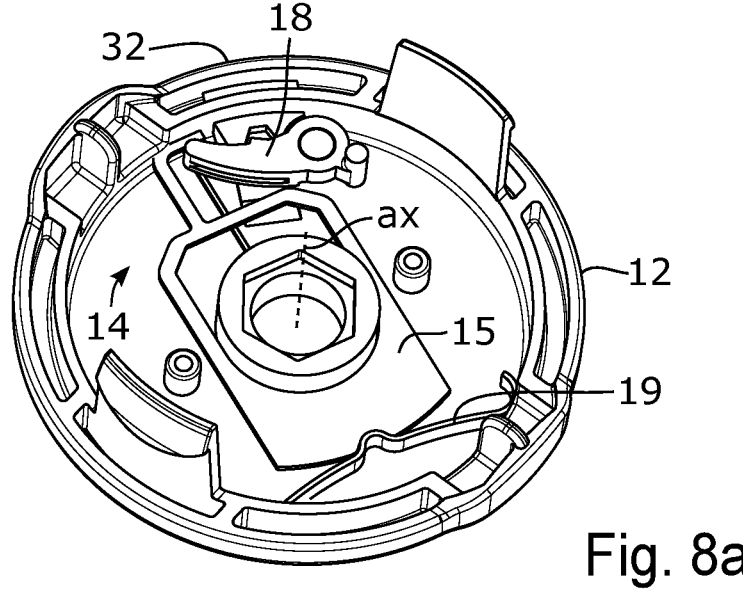
FIG. 8a shows a schematic overview of a portion of a housing of the trimmer head according to the embodiments illustrated in FIG. 7.

FIG. 8a shows a schematic overview of a portion of the housing 12 of the trimmer head 1 according to the embodiments illustrated in FIG. 7. In FIG. 8a, the spring-loaded locking mechanism 14 of the trimmer head 1 can be seen. As in the embodiments explained with reference to FIG. 1-FIG. 5a, the spring-loaded locking mechanism 14 according to these embodiments comprises a spring 19, a baseplate 15, and a locking latch 18. According to the embodiments illustrated in FIG. 8a, the spring 19 is a type of leaf spring. According to further embodiments, the trimmer head 1 according to the embodiments illustrated in FIG. 8b may comprise a coil spring as the embodiments of the trimmer head 1 explained with reference to FIG. 1-FIG. 5a.

Moreover, according to the embodiments illustrated in FIG. 8a, there is a play in the connection between the locking latch 18 and the base plate 15 allowing a movement of the locking latch 18 in a radial direction of the trimmer head 1 towards a rotation axis ax of the trimmer head 1 without moving the base plate 15. The trimmer head 1 is configured to rotate around the rotation axis ax during operation of the trimmer head 1. Moreover, according to the embodiments illustrated in FIGS. 7 and 8a, the button 32 is operably connected to the locking latch 18. In FIG. 8a, the spring-loaded locking mechanism 14 is illustrated in a state in which the button 32 is unpressed.

Figure 8B:
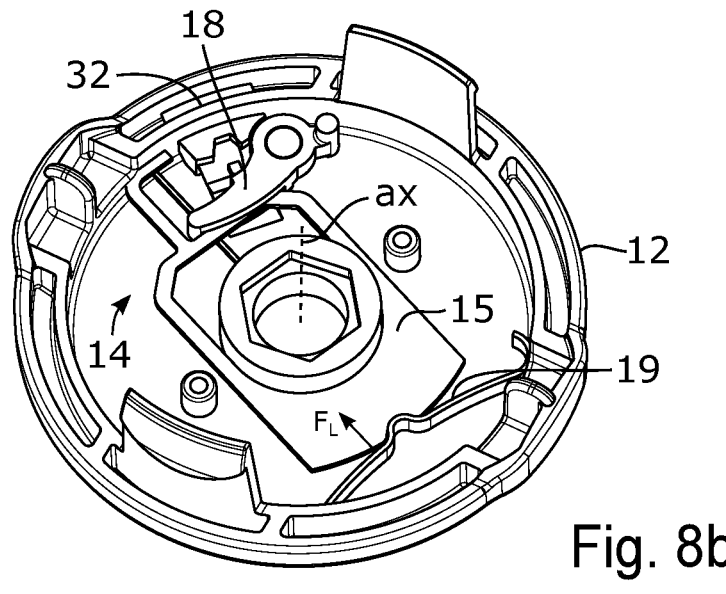
FIG. 8b shows the overview of the portion of the housing illustrated in FIG. 8a in which a button has been pressed in a direction towards a rotation axis of the trimmer head.

FIG. 8b shows the overview of the portion of the housing 12 illustrated in FIG. 8a in which the button 32 has been pressed in a direction towards the rotation axis ax of the trimmer head 1. As can be seen in FIG. 8b, as a result thereof, the locking latch 18 has been moved in the direction towards the rotation axis ax. Due to the play between the locking latch 18 and the base plate 15, a user does not have to overcome the locking force $F_L$ applied to the locking mechanism 14 by the spring 19 when pressing the button 32. Thus, the locking mechanism 14 is moved from the locked position to the unlocked position upon pressing of the button 32 due to the following movement of the locking latch 18 to the unlocking position illustrated in FIG. 8b.

Below, simultaneous reference is made to FIG. 7-FIG. 8*b*, if not indicated otherwise. A user may for example press the button 32 to move the locking mechanism 14 to the unlocking position and pull a trimmer line 3 out of openings 11 of the trimmer head 1 to manually feed trimmer line 3. As an example, a user may perform a manual feed of trimmer line 3 when the trimmer line 3 is too short for causing sufficient momentum to extract trimmer line 3 by rotation of the trimmer head 1.

Figure 9:
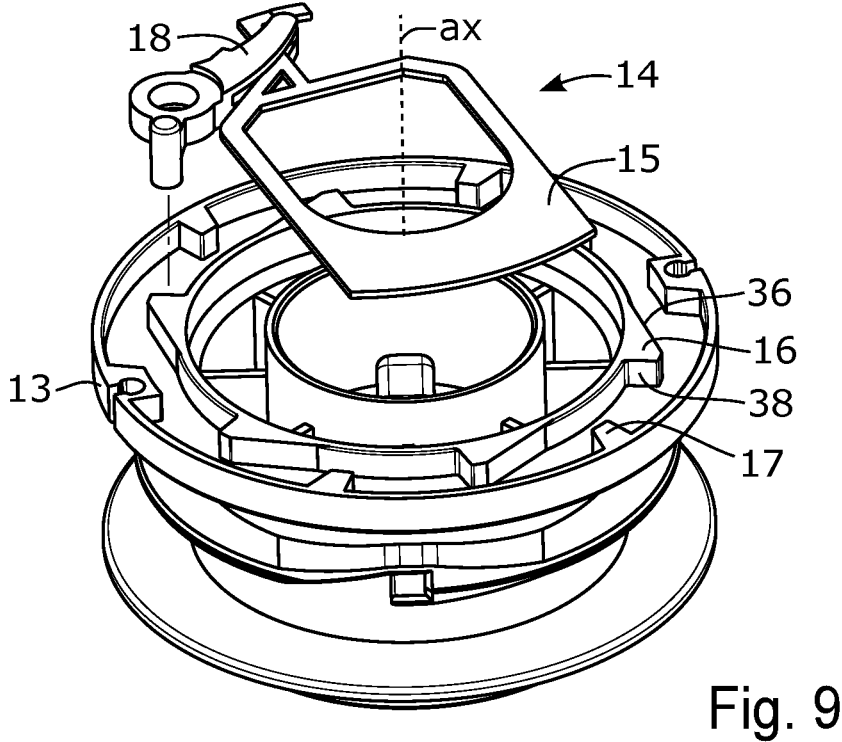
FIG. 9 shows a schematic overview of a trimmer line spool with a locking mechanism of the trimmer head according to the embodiments explained with reference to FIG. 7-FIG. 8b.

FIG. 9 shows a schematic overview of a trimmer line spool 13 with a locking mechanism 14 of the trimmer head 1 according to the embodiments explained with reference to FIG. 7-FIG. 8*b*. Below, simultaneous reference is made to FIG. 7-FIG. 9, if not indicated otherwise. The locking mechanism 14 is configured to lock the trimmer line spool 13 to the housing 12 when in the locking position, as according to the embodiments of the trimmer head 1 explained with reference to FIG. 1-FIG. 5*a*. However, according to these embodiments, the trimmer line spool 13 is rotationally locked to the housing 12 in only one of the two rotational directions. That is, as can be seen in FIG. 9, each of the stops 16 of the trimmer line spool 13 comprises an angled surface 36 at one side of the stop 16 and a stopping surface 38 at the other side of the stop. The angled surfaces 36 of the stops 16 allows a displacement of the locking latch 18 to the unlocking position by a relative rotation between the housing 12 and the trimmer line spool 13 around the rotation axis ax as is explained in the following.

Figure 10:
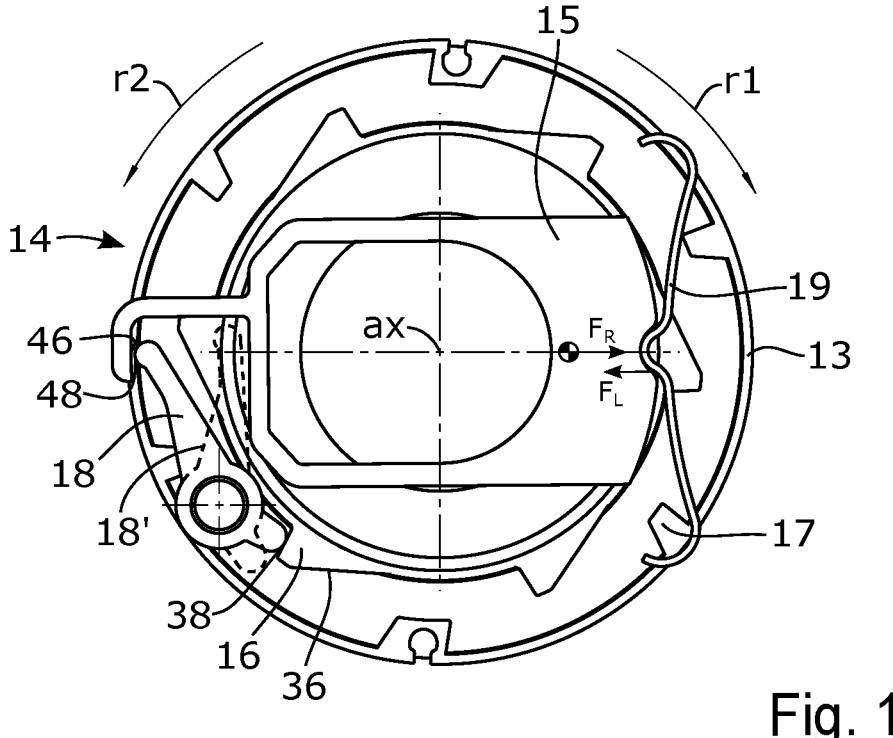
FIG. 10 shows the schematic overview of a trimmer line spool with the locking mechanism according to the embodiments illustrated in FIG. 9 where the trimmer line spool is illustrated in a viewing direction coinciding with the rotation axis of the trimmer head.

FIG. 10 shows the schematic overview of a trimmer line spool 13 with the locking mechanism 14 according to the embodiments illustrated in FIG. 9 where the trimmer line spool 13 is illustrated in a viewing direction coinciding with the rotation axis ax of the trimmer head 1. Below, simultaneous reference is made to FIG. 7-FIG. 10, if not indicated otherwise. The components of the locking mechanism 14, including the locking latch 18, are attached to the housing 12 of the trimmer head 1. In FIG. 10, the locking latch 18 is illustrated in the locking position and is illustrated as abutting against a stop surface 38 of one of the stops 16 of the trimmer line spool 13. The abutting contact between the locking latch 18 and the stop surface 38 of the stop 16 prevents rotation of the trimmer line spool 13 relative to the housing 12 in a first rotational direction r1 indicated in FIG. 10. Likewise, the abutting contact between the locking latch 18 and the stop surface 38 of the stop 16 prevents rotation of the housing 12 relative to the trimmer line spool 13 in a second rotational direction r2 indicated in FIG. 10. The second rotational direction r2 is opposite to the first rotational direction r1.

However, the angled surfaces 36 of the stops 16 of the trimmer line spool 13 are configured such that the locking latch 18 is displaced to the unlocking position by the abutting contact between the angled surface 36 and the locking latch 18. In FIG. 10 a locking latch 18' is schematically illustrated in dashed line for facilitating understanding of the working principle of the trimmer head 1 and the interaction between the locking mechanism 14 and the stops 16 of the trimmer head 1. As understood from the above, the trimmer line spool 13 is free to rotate relative to the housing 12 in the second rotational direction r2 indicated in FIG. 10. Likewise, the housing 12 is free to rotate relative to the trimmer line spool 13 in the first rotational direction r1 indicated in FIG. 10 which facilitates loading of trimmer line onto the trimmer line spool 13 as is explained in the following.

Figure 11:
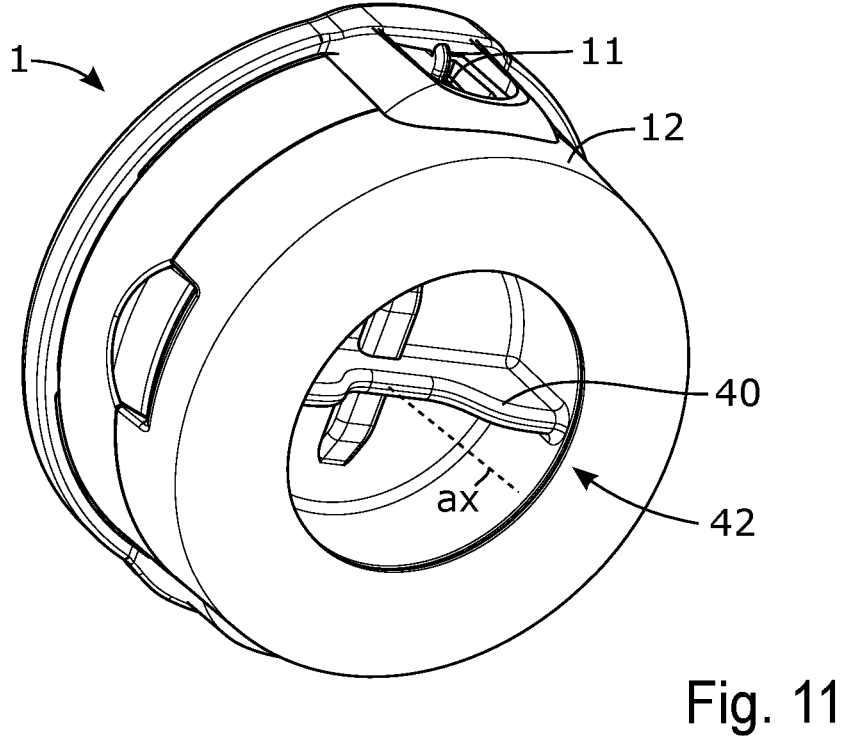
FIG. 11 illustrates a perspective view of an underside of the trimmer head according to the embodiments explained with reference to FIG. 7-FIG. 10.

FIG. 11 illustrates a perspective view of an underside of the trimmer head 1 according to the embodiments explained with reference to FIG. 7-FIG. 10. As clearly seen in FIG. 11, the trimmer line spool 13 of the trimmer head 1 is provided with a grip 40. According to the illustrated embodiments, the grip 40 is formed as a knob and is arranged inside a recess 42 at an underside of the trimmer head 1. However, according to some further embodiments, the grip 40 may also protrude out from the trimmer head 1. The grip 40 may be integral to the trimmer line spool 13 or may be a separate part attached to the trimmer line spool 13. The grip 40 further facilitates loading of trimmer line, as is explained in the following.

Figure 12:
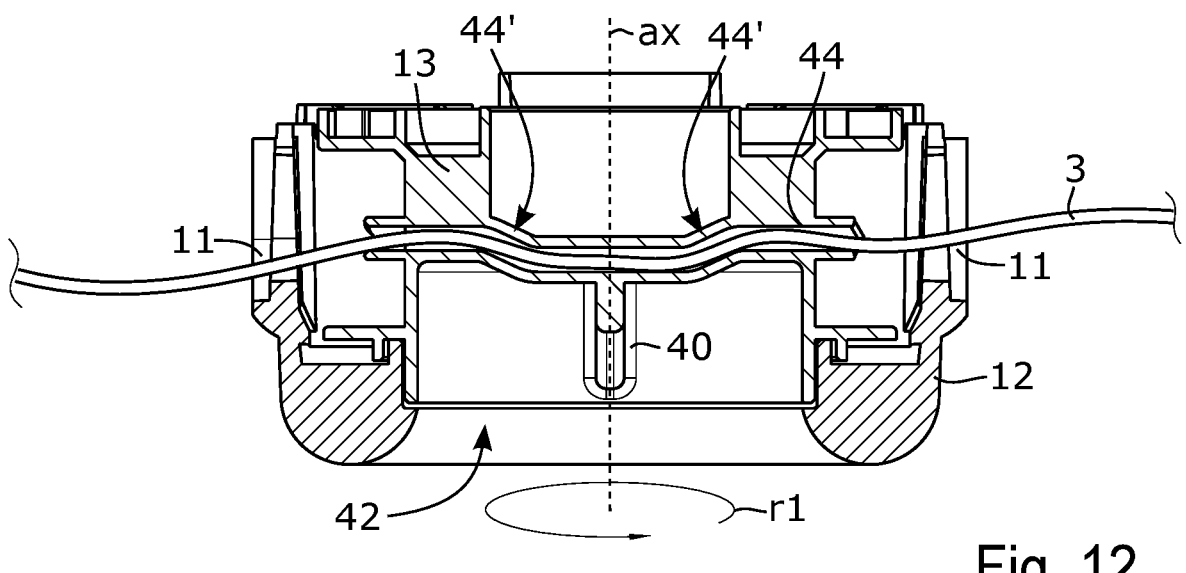
FIG. 12 illustrates a cross section of the trimmer head illustrated in FIG. 11.

FIG. 12 illustrates a cross section of the trimmer head 1 illustrated in FIG. 11. In FIG. 12, the cross section is made in a plane comprising the rotation axis ax of the trimmer head 1. Below, simultaneous reference is made to FIG. 7-FIG. 12, if not indicated otherwise. Due to the features of the trimmer head 1 according to these embodiments, a user can load trimmer line 3 into the trimmer line spool 13 without having to dissemble the trimmer head 1 simply by inserting a trimmer line 3 into the opening 11 of the housing 12 and through a through hole 44 of the trimmer line spool 13. The user may then manually rotate the trimmer line spool 13 and the housing 12 relative to each other to feed trimmer line 3 into the trimmer line spool 13. In this manner, the user may perform a manual relative rotation between the trimmer line spool 13 and the housing 12. As understood from the above, the user may turn the housing 12 of the trimmer head 1 relative to the trimmer line spool 13 in the first rotational direction r1 indicated in FIG. 10 and FIG. 12 to spool the trimmer line spool 13 with trimmer line 3. Obviously, as an alternative, the user may turn the trimmer line spool 13 of the trimmer head 1 relative to the housing 12 in the second rotational direction r2 indicated in FIG. 10 to spool the trimmer line spool 13 with trimmer line 3.

The user may use the grip 40 and may grab around the housing 12 when turning the trimmer line spool 13 relative to the housing 12. Since the grip 40 is arranged inside the recess 42 on the underside of the trimmer head 1, no portions of the grip 40 are protruding out from the trimmer head 1. In this manner, the grip 40 is less likely to bump into objects during operation of the trimmer head 1. Moreover, the grip 40 may not add to the cutting height of the trimmer head 1. However, as explained above, according to some further embodiments, the grip 40 may also protrude out from the trimmer head 1.

As can be seen in FIG. 12, the through hole 44 of the trimmer line spool 13 comprise a number of non-straight sections 44'. The non-straight sections 44' may also be referred to as bent sections or curved sections. The non-straight sections 44' can provide space for further components and arrangements of the trimmer head 1. However, according to further embodiments, the through hole 44 of the trimmer line spool 13 may be straight along the full length of the through hole 44.

In the above-described loading procedure of trimmer line 3 into the trimmer line spool 13, the user may have to align the openings 11 of the housing 12 with openings of the through hole 44 before trimmer line 3 can be inserted into openings of the through hole 44 of the trimmer line spool 13. However, this can be performed in a simple manner because the housing 12 is free to rotate relative to the trimmer line spool 13 in the first rotational direction r1 as explained above and the trimmer line spool 13 is free to rotate relative to the housing 12 in the second rotational direction r2. The trimmer head 1 may comprise one or more markings, such as one or more symbols, arrows, text, or the like indicating one or more rotational positions between the trimmer line spool 13 and the housing 12 in which the openings 11 of the housing 12 is/are aligned with the openings of the through hole 44 of the trimmer line spool 13.

The following is explained with reference to FIG. 10. During rotation of the housing 12 relative to the trimmer line spool 13 one revolution in the first rotational direction r1, the locking latch 18 will reach all stops 16 of the trimmer line spool 13 and will be displaced between the locking and unlocking positions by the interaction with the angled surfaces 36 of the stops 16. However, if the housing 12 is rotated in the second rotational direction r2 relative to the trimmer line spool 13, the locking latch 18 will reach a stop surface 38 of one of the stops 16 which will prevent further rotation of the housing 12 relative to the trimmer line spool 13 in the second rotational direction r2. Thus, the interaction between the locking latch 18 and the stops 16 of the trimmer head 1 according to the embodiments illustrated in FIG. 7-FIG. 12 functions as a so-called ratchet mechanism which only allows rotation of the trimmer line spool 13 relative to the housing 12 in one rotational direction.

As understood from the above, the trimmer head 1 is configured such that trimmer line 3 is fed into the trimmer line spool 13 when trimmer line spool 13 is rotated relative to the housing 12 in the second rotational direction r2 and such that trimmer line 3 is fed out from the trimmer line spool 13 when the trimmer line spool 13 is rotated relative to the housing 12 in the first rotational direction r1.

According to the embodiments illustrated in FIG. 7-FIG. 12, the locking latch 18 is a pivotal locking latch 18. That is, also in these embodiments, the locking latch 18 is pivotally arranged around a pivot axis. The locking latch 18 may be biased by a spring towards the locking position.

As is indicated in FIG. 10, the base plate comprises an abutment surface 46 configured to abut against a portion 48 of the locking latch 18. During operation, when the rotation speed of said trimmer head 1 is increased above the operating speed which causes the releasing force $F_R$ to become greater than the locking force $F_L$, the movement of the base plate 15 is transferred to a movement of the locking latch 18 towards the unlocking position by the abutting contact between the abutment surface 46 of the base plate 15 and the portion 48 of the locking latch 18. In this manner, the locking mechanism 14 can be transferred to the unlocking position as explained with reference to FIG. 1-FIG. 6. However, as understood from the herein described, if the locking latch 18 is displaced towards the unlocking position by a pressing of the button 32 or by an angled surface 36 of a stop 16 of the trimmer line spool 13, the abutting contact between the abutment surface 46 of the base plate 15 and the portion 48 of the locking latch 18 is released such that the locking latch 18 is free to move towards the unlocking position without moving the base plate 15. The trimmer head 1 according to the embodiments illustrated in FIG. 7-FIG. 12 comprises a number of releasing stops 17. The releasing stops 17 have the same features and function as the releasing stops 17 of the trimmer head 1 explained with reference to FIG. 1-FIG. 6.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, the locking mechanism may be constructed so that the stops and the releasing stops change places, with the locking latch resting against an outer stop in the locked position. The locking latch moving would in this case move inwards to the unlocked position by increasing the rotation speed of the trimmer head to be above an operating speed.

It is also possible that the locking mechanism is designed so that the centrifugal force makes the locking latch to move vertically between the stops and releasing stops.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A trimmer head comprising a rotatable housing connectable to a trimmer line spool rotatably supported by said housing and a locking mechanism for locking said trimmer line spool to said housing with a locking force, wherein the locking mechanism is biased to a locked position engaging a stop on the spool and is arranged to be moved to an unlocked position when a rotation speed of said trimmer head is increased above an operating speed, the increased rotation speed causing a releasing force greater than the locking force and wherein said locking mechanism in the unlocked position disengages from the stop on the spool to permit the spool to rotate relative to the housing, such that a trimmer line spooled around the trimmer line spool is released and to be pulled out by a centrifugal force caused by the rotation of the trimmer head, thereby allowing feed of the trimmer line, wherein the locking mechanism is a spring-loaded locking mechanism and the increased speed shifts a center of gravity of the locking mechanism, thereby pivoting the locking mechanism against a biasing force of the spring, the spring being mounted in engagement with the housing and causing the releasing force to be greater than the locking force of the spring-loaded locking mechanism.

2. The trimmer head according to claim 1, wherein the locking mechanism is arranged to be moved back to the locked position from the unlocked position when the rotation speed of said trimmer head is decreased below the operating speed, wherein the releasing force is reduced to be smaller than the locking force.

3. The trimmer head according to claim 1, wherein the locking mechanism comprises a pivotal locking latch pivotably mounted to the housing, wherein the pivotal locking latch is arranged to engage with the stop in the locked position.

4. The trimmer head according to claim 3, wherein the trimmer line spool further comprises a releasing stop, wherein the pivotal locking latch is arranged to engage with the releasing stop when the locking mechanism is moved to the unlocked position.

5. The trimmer head according to claim 1, wherein the trimmer head comprises a button arranged on the housing, wherein the button is operably connected to the locking mechanism to move the locking mechanism to the unlocked position when the button is pressed.

6. The trimmer head according to claim 1, wherein the locking mechanism allows a manual rotation of the trimmer line spool relative to the housing in one rotational direction.

7. A trimmer comprising a trimmer head according to claim 1, wherein the trimmer further comprises drive means for driving the trimmer head to rotate and wherein the trimmer is arranged to cause the trimmer line spool to move relative to the housing by increasing the rotation speed of the trimmer head to be above an operating speed.

8. The trimmer according to claim 7, wherein the trimmer is arranged to cause the locking mechanism to move from the unlocked position to the locked position locking the trimmer line spool to the housing by decreasing the rotation speed of the trimmer head below the operating speed.

9. The trimmer according to claim 8, wherein the trimmer is arranged to decrease and increase the rotation speed of the trimmer head until the rotation speed of the trimmer head is below the operating speed based on control from an operator.

10. The trimmer according to claim 8, wherein the trimmer is arranged to decrease the rotation speed of the trimmer head in response to the rotation speed reaching a maximum rotation speed based on control from an operator.

11. The trimmer according to claim 8, wherein the trimmer is arranged to decrease the rotation speed of the trimmer head a predetermined time after the rotation speed has been increased based on control from an operator.

12. The trimmer according to claim 7, wherein the trimmer is an electric trimmer and the drive means comprises an electrical power source and an electric motor.

13. A trimmer head comprising:

a rotatable housing connectable to a trimmer line spool rotatably supported by said housing; and a locking mechanism for locking said trimmer line spool to said housing with a locking force, wherein the locking mechanism is arranged to be moved from a locked position to an unlocked position when a rotation speed of said trimmer head is increased above an operating speed, the increased rotation speed causing a releasing force greater than the locking force, wherein said locking mechanism in the unlocked position releases the trimmer line spool from said housing such that the trimmer line spool is rotatable relative to the housing and a trimmer line spooled around the trimmer line spool is released and to be pulled out by a centrifugal force caused by the rotation of the trimmer head, thereby allowing feed of the trimmer line, wherein the locking mechanism comprises a pivotal locking latch pivotably mounted to the housing and the trimmer line spool comprises a stop, wherein the pivotal locking latch is arranged to engage with the stop in the locked position, and wherein the trimmer line spool further comprises a releasing stop, wherein the pivotal locking latch is arranged to engage with the releasing stop when the locking mechanism is moved to the unlocked position.

* * * * *